United States Patent [19]

O'Brien et al.

[11] Patent Number: 5,514,266

[45] Date of Patent: May 7, 1996

[54] OIL-WATER SEPARATION APPARATUS EMPLOYING A FLOATING SKIMMER, A HYDROCYCLONE AND A TUBULAR SEPARATION DEVICE

[75] Inventors: Kevin J. O'Brien; Gavan J. J. Prendergast, both of Victoria, Australia

[73] Assignee: Conoco Specialty Products Inc., Houston, Tex.

[21] Appl. No.: 240,934

[22] Filed: May 10, 1994

[30] Foreign Application Priority Data

May 10, 1993 [AU] Australia ................. PL8693

[51] Int. Cl.$^6$ .................. B01D 17/02; E02B 15/04
[52] U.S. Cl. .............. 210/167; 210/195.1; 210/221.2; 210/242.1; 210/242.3; 210/252; 210/258; 210/259; 210/512.1; 210/538; 210/923
[58] Field of Search ............... 210/167, 194, 210/195.1, 241, 220, 242.1, 242.3, 252, 255, 256, 257.1, 259, 512.1, 512.2, 512.3, 532.1, 538, 540, 923, 221.2, 258

[56] References Cited

U.S. PATENT DOCUMENTS

| | | | |
|---|---|---|---|
| 1,290,820 | 1/1919 | Ten Winkel | 210/255 |
| 2,003,140 | 5/1935 | Dehn | 210/538 |
| 3,743,102 | 7/1973 | Mensing et al. | |
| 3,762,548 | 10/1973 | McCabe | 210/923 |
| 3,782,553 | 1/1974 | Brekke | 210/923 |
| 4,797,210 | 1/1989 | Lonardo | 210/923 |
| 4,855,065 | 8/1989 | Keeter et al. | 210/776 |
| 5,080,792 | 1/1992 | McGovern et al. | |
| 5,158,677 | 10/1992 | Hewitt et al. | 210/776 |
| 5,366,641 | 11/1994 | Hadfield et al. | 210/242.3 |

FOREIGN PATENT DOCUMENTS

| | | |
|---|---|---|
| 353034 | 1/1990 | European Pat. Off. . |
| 2130579 | 3/1972 | France . |
| 8908023 | 1/1990 | Germany . |

*Primary Examiner*—Robert A. Dawson
*Assistant Examiner*—Robert James Popovics
*Attorney, Agent, or Firm*—Andrus, Sceales, Starke & Sawall

[57] ABSTRACT

An apparatus for treating contaminated, e.g. oily, water including a floating skimmer (3) for skimming the surface of the contaminated water (2). The contaminated water from the skimmer is fed to a hydrocyclone (6) for separation of the water and contaminant. The hydrocarbon rich stream from the hydrocyclone undergoes further separation using a spear (8).

6 Claims, 3 Drawing Sheets

OIL-WATER SEPARATION APPARATUS EMPLOYING A FLOATING SKIMMER, A HYDROCYCLONE AND A TUBULAR SEPARATION DEVICE

BACKGROUND OF THE INVENTION

The invention relates to a process for the treatment of water contaminated with products, in particular hydrocarbon or petroleum products such as oil and petrol, but also contaminants such as tallow, vegetable oil, and light solid plastic or other particles. Such contaminated water may include run off water from a petroleum storage, loading or transferring station, or from any other source where a contaminated water run off is anticipated, for example in carparks, chemical plants, oil refineries, machine shops, abattoirs and the like.

In known processes, contaminated water may be collected from a source area potentially containing contaminants, and stored in a receptacle. The contaminated water may then be either allowed to flow directly into open drains or sewers, or more usually be treated to remove as much of the contaminant as possible before the water stream is allowed to leave the site. Such treatment processes for cleaning water contaminated with oil or petrol generally involve pumping the contaminated water into an above ground tank or vessel, which contain a series of parallel plates or baffles which allow the oil droplets in the water mixture to rise to the surface of the vessel under the normal action of gravity settling, from where the oil is generally skimmed from the top and into a drum or other storage container for later removal from the site. The cleaner water stream is generally allowed to enter the open drains or sewers. These vessels are generally of a category called Plate Separators, or Corrugated Plate Interceptors, (CPI).

There are a number of difficulties and dangers with the Plate Separator and CPI type systems, the result of which is that the water quality produced is often not of an acceptable level to be safely or legally discharged into open drains or sewers, and may contain enough residual petroleum or other inflammable contaminant to produce a potentially explosive mixture in the presence of an ignition source, or be a pollutant to the environment.

SUMMARY OF THE INVENTION

According to the first aspect of the present invention, an apparatus for treating water contaminated with a lighter contaminant comprises a floating skimmer for skimming the surface of the contaminated water, and a cyclonic separator to which the contaminated water from the skimmer is fed for at least partial separation of the water and contaminant.

It has been found that by removing the contaminated water via a floating skimmer from the top of a contaminated water receptacle, a significant volume of floating contaminant is thus removed. In the case of inflammable contaminants, such as hydrocarbon this reduces the risk of explosion or fire by reducing vapour emission to atmosphere by eliminating a hydrocarbon layer build-up, and may further reduce the potential of hydrocarbon dissolving into water solution into the water phase.

The cyclonic separator is preferably a hydrocyclone. This has no moving parts, provides an efficient separation of contaminants from water, and can be designed to treat emulsions with contaminant droplets of less than 10 μm.

If the water stream from the cyclonic separator is sufficiently pure, it can be discharged into the environment. However, particularly during initial operation, when the skimmer is removing a free contaminant layer, the water stream from the cyclonic separator may not be sufficiently pure. In this case, a recycle line should be provided from the underflow outlet of the cyclonic separator to the source of contaminated water. This provides an additional benefit in that the cyclonic separator generates a vortex action which scrubs liquid from solid contaminants so that the scrubbed solids can be returned to the contaminated water receptacle where they settle out.

An air driven pump is preferably used to pump the contaminated water from the skimmer to the cyclonic separator. The pump is preferably a diaphragm pump which is easy to maintain and inexpensive. It is also safer in a hazardous environment as it is unlikely to generate an electrical discharge.

The air pump is preferably arranged so that its exhaust discharges into a receptacle forming a source in which the contaminated water is collected. This can be used to assist in the removal of volatile fractions from the receptacle.

The contaminant rich stream from the overflow of the cyclonic separator may be fed to a second separator for further separation. Such a separator may be a spear which takes the form of a separator comprising a first generally upright tubular member having a coupling for connection to a vessel and an inlet for the contaminant rich stream from the cyclonic separator to pass through the first tubular member and into the vessel; and a second tubular member having an outlet for separated water, provided within the first tubular member, and extending below the first tubular member to such as extent that, in use, it opens into the lower region of the vessel in which region the water settles.

The spear allows a vessel, such as a storage drum, to be filled with a contaminant rich stream which still contains some water. This water sinks under gravity to the bottom of the vessel from where it is discharged through the second tubular member so that the vessel is left containing substantially only contaminant. The discharged water may be recycled or disposed of depending on its purity. Once a vessel is substantially filled with contaminants, the spear can be transferred to another vessel.

The spear also forms a second independent aspect of the present invention which can be defined in the broadest terms as a separator comprising a first generally upright tubular member having a coupling for connection to a vessel and an inlet for a liquid mixture containing a light and a heavy phase to pass through the first tubular member and into the vessel; and a second tubular member having an outlet for separated heavy phase liquid, provided within the first tubular member, and extending below the first tubular member to such an extent that, in use, it opens into the lower region of the vessel in which region the heavy phase liquid settles.

To prevent the skimmer from becoming clogged by solid debris, it is preferably provided with a screen.

The apparatus of the present invention has the advantage that it is light and compact. Thus, it is readily suited to being provided on a trolley. This makes the apparatus readily portable so that it can be moved from one site to another as required. Once at the required site, the skimmer is lowered onto the contaminated water, and, if provided, the spear is inserted into a vessel for receiving the contaminant.

According to a third aspect of the present invention, a method for treating water contaminated with a lighter contaminant comprises skimming the surface of the contaminated water using a floating skinner; feeding the skimmed contaminated water to a cyclonic separator; and separating, at least partly, the water from the contaminant.

The method may comprise additional steps such as returning the water separated by the cyclonic separator to the contaminated water, or further separating the contaminant rich stream from the cyclonic separator.

BRIEF DESCRIPTION OF THE DRAWING

Examples of apparatus constructed in accordance with the various aspects of the present invention will now be described with reference to the accompanying drawings, in which.

DETAILED DESCRIPTION OF THE PREFERRED EMBODIMENTS

Figure 1:
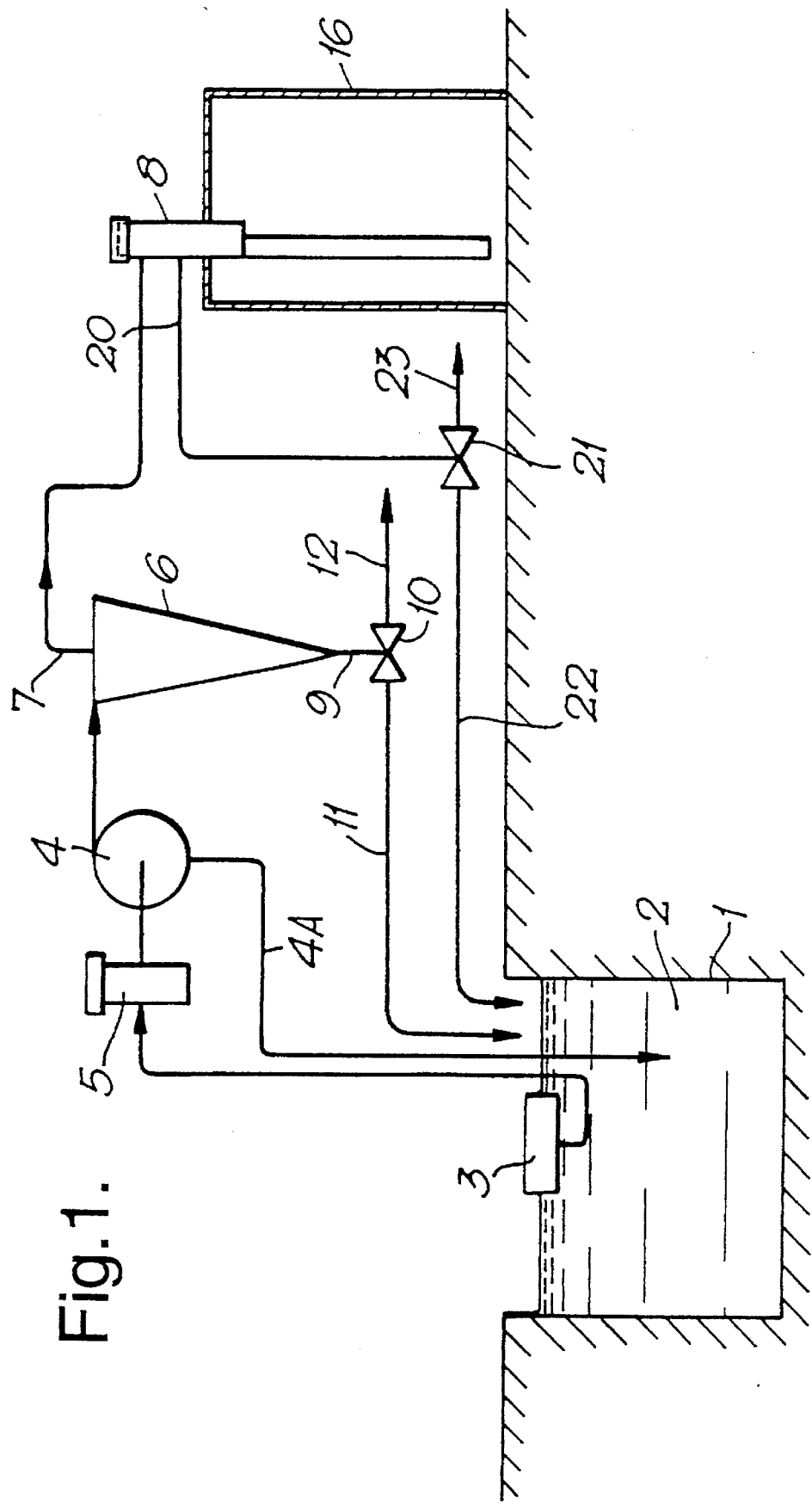
FIG. 1 is a schematic diagram of the separation apparatus.

In FIG. 1 there is shown a receptacle 1 which is a below ground contamination pit, but may also be a tank. The receptacle 1 contains hydrocarbon contaminated water 2, such as oily run off from a forecourt of a petroleum filling station. A skimmer 3 floats on the surface of the oily water. The skimmer 3 floats on the surface of the hydrocarbon contaminated water which is pumped by a low shear air operated diaphragm pump 4 via a strainer 5 to a hydrocylone 6.

The pump 4 may be provided with an exhaust line 4A which leads to the receptacle 1. This provides an air stripping system which improves the separation of the water and contaminant in the receptacle 1, helps to remove residual dissolved hydrocarbons, and reduces dangerous vapour build up.

The hydrocyclone 6 has a "de-oiling" configuration, for example satisfying LD>10 and $D_0/D<0.3$, where L is the length of the hydrocyclone, D is the major hydrocyclone diameter, and $D_0$ is the overflow orifice diameter.

The overflow 7 from the hydrocyclone 6 leads to a secondary separator in the form of a spear 8. The underflow 9 from the hydrocyclone is controlled by a valve 10 to flow either back into the receptacle 1 through a first recycle line 11, or to be discharged through a first clean water discharge line 12.

Figure 3:
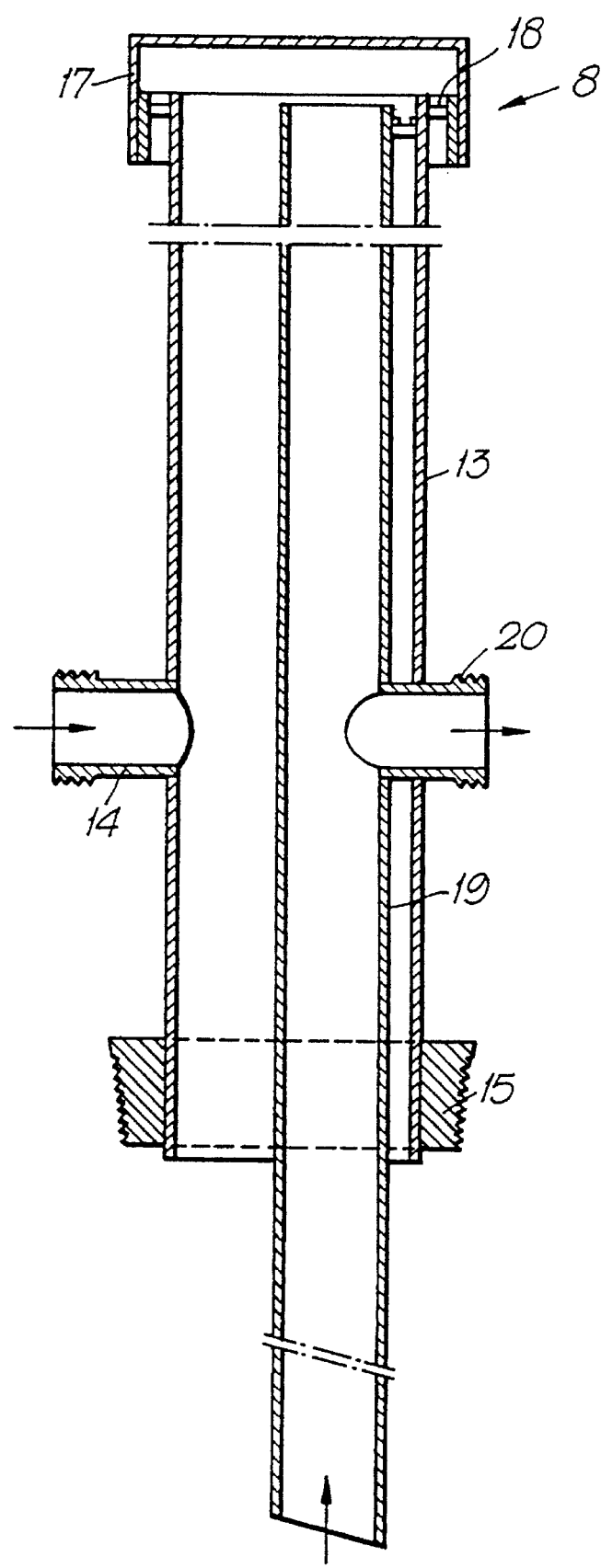
FIG. 3 is a diagrammatic sectional view of a part of the apparatus shown in FIGS. 1 and 2.

The details of the spear 8 are shown in FIG. 3. The spear 8 comprises a first upright tubular member 13 provided with an inlet 14 for the hydrocarbon rich stream from the overflow 7 of hydrocyclone 6. The lower end of the first tubular member 13 is provided with a plug 15 for coupling to a storage drum 16. The spear could alternatively be coupled to a tank or to a storage compartment of the receptacle 1. The upper end of the first tubular member 13 is covered by a cap 17 which is fixed to the first tubular member by a spider 18 to prevent the entry of rain water. A second tubular member 19 is provided within the first tubular member 13, and has a lateral outlet 20 for separated water extending through the first tubular member 13. The second tubular member 19 extends below the end of the first tubular member 13. As can be seen from FIG. 1, the second tubular member 19 extends to a position close to the bottom of storage drum 16.

The flow through outlet 20 is controlled by a valve 21 to flow either back to the receptacle 1 through second recycle line 22, or to be discharged through a second clean water discharge line 23.

In use, the skimmer 3 initially skims a free layer of hydrocarbons which have risen to the top of the hydrocarbon contaminated water 2. These hydrocarbons are pumped to the hydrocyclone 6 for separation. At this stage, the underflow from the hydrocyclone still contains a high proportion of hydrocarbons and is therefore recycled along first recycle line 11 back to the receptacle 1. The overflow from the hydrocyclone 6 is fed to the spear 8 and enters the storage drum 16.

In the storage drum 16, any air within the drum is displaced by the initial flow. The water settles to the bottom of the drum and is discharged through the second tubular member 19 from which, depending upon its purity, it is either recycled through second recycle line 22 or is discharged through second clean water discharge line 23.

Once the free layer of hydrocarbons in the receptacle 1 has been used up, the skimmer begins discharging an emulsion of water and hydrocarbons. The hydrocyclone 6 can generally more readily separate such an emulsion so that the underflow 9 will generally comprise water of a sufficient purity that it can be discharge through the first clean water discharge line 12.

Figure 2:
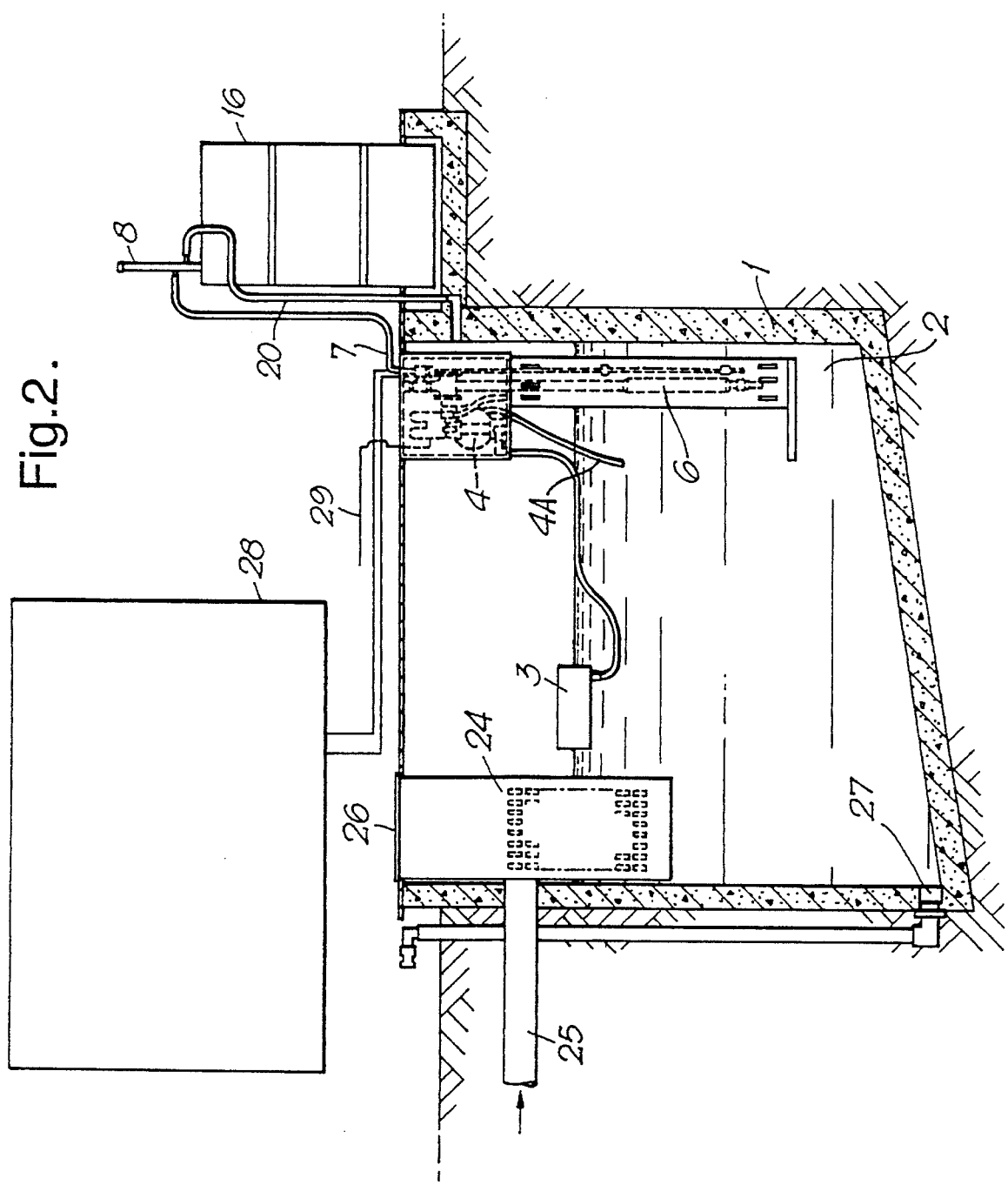
FIG. 2 is a diagrammatic sectional view of a particular construction of the apparatus.

FIG. 2 shows an example of a particular construction of the apparatus. Notable features illustrated here include the screen 24 which covers an inlet 25 to the receptacle 1 for trapping larger solids. Access to the screen 24 can be gained through inspection opening 26.

The pump 4 and hydrocyclone 6 are provided within the receptacle 1. Alternatively, they, together with the skimmer 3 and spear 8 can be provided on a trolley to provide a mobile system.

The receptacle 1 is provided at its lowermost point with an outlet 27 out through which solids which have settled to the bottom of the receptacle 1 can be pumped.

The apparatus is additionally provided with a control unit 28 for controlling the operation of the pump 4, hydrocyclone 6 and associated valves. An air supply 29 for the pump is also provided.

We claim:

1. An apparatus for treating water contaminated with a lighter contaminant, the contaminated water being contained in a source for the contaminated water and having an exposed surface, said apparatus comprising:

a skimmer floatable on the surface of the contaminated water and skimming off a portion thereof;

a hydrocyclone separator receiving the portion skimmed off by said skimmer, said hydrocyclone separator at least partially separating the contaminant from the water and discharging a contaminant rich stream from an overflow outlet;

a second separator receiving the contaminant rich stream from said overflow outlet, said second separator separating the contaminant from the water within a vessel for storing the contaminant, said second separator comprising an elongated tubular structure insertable in the vessel;

said second separator having a first, generally upright, tubular member with a coupling for connecting the second separator to the vessel when said second separator is inserted in the vessel, said first tubular member having a first end and a second end, said first end of said first tubular member having an inlet which is exterior of the vessel when said second separator is inserted in said vessel, said inlet receiving the contaminant rich stream from said hydrocyclone separator, said contaminant rich stream passing through said first tubular member and into the vessel, said second end of said first tubular member being positionable in the vessel to a given depth when said second separator is inserted in the vessel; and said second separator having a second tubular member having a first end and a second end, said second tubular member being provided at least partially within said first tubular member, said first end of said second tubular member having an outlet for separated water which is exterior of the vessel when the second separator is inserted in the vessel, said second end of said second tubular member being positionable in the vessel to a depth below said second end of said first tubular member when said second separator is inserted in the vessel to open into a region of the vessel in which the water settles.

2. An apparatus according to claim 1, wherein said hydrocyclone separator has an underflow outlet from which the separated water is discharged, and wherein a recycle line is provided from the underflow outlet of the hydrocyclone separator to the source for the contaminated water.

3. An apparatus according to claim 2, wherein the pump is a diaphragm pump.

4. An apparatus according to claim 1 wherein the apparatus is provided with means for rendering said apparatus mobile.

5. An apparatus according to claim 1 further comprising an air driven pump for pumping the contaminated water from said skimmer to said hydrocyclone separator.

6. An apparatus according to claim 5, wherein the pump has an exhaust that discharges air into the source for contaminated water.

* * * * *